United States Patent [19]

Rice

[11] Patent Number: 5,433,407
[45] Date of Patent: Jul. 18, 1995

[54] PALM REST FOR USE WITH COMPUTER POINTING DEVICES

[76] Inventor: Gregory H. Rice, 4351 Forest Ave. SE., Mercer Island, Wash. 98040

[21] Appl. No.: 104,365

[22] Filed: Aug. 9, 1993

[51] Int. Cl.⁶ .......................................... B43L 15/00
[52] U.S. Cl. .................................. 248/118.1; 248/918
[58] Field of Search ............... 248/118, 118.1, 118.3, 248/118.5, 918; 400/715

[56] References Cited

U.S. PATENT DOCUMENTS

| | | | |
|---|---|---|---|
| 4,482,064 | 11/1984 | Berke et al. | 248/118 X |
| 4,862,165 | 8/1989 | Gart | 341/20 |
| 4,973,176 | 11/1990 | Dietrich | 248/118 X |
| 4,976,407 | 12/1990 | Schwartz et al. | 248/118.3 |
| 5,004,196 | 4/1991 | Gross | 248/118.3 |
| 5,029,260 | 7/1991 | Rollason | 235/145 |
| 5,074,511 | 12/1991 | Wilson | 248/346 |
| 5,088,668 | 2/1992 | Grimm | 248/118.3 |
| 5,125,606 | 6/1992 | Cassano et al. | 248/118 |
| 5,131,614 | 7/1992 | Garcia et al. | 248/118 |
| 5,203,527 | 4/1993 | Rubey | 248/918 X |

OTHER PUBLICATIONS

Heilbroner, David, "The Handling of an Epidemic," *Working Woman*, Feb. 1993, pp. 60–65.

Lyon, Bruce, "Video Display Terminal Ergonomics," *Professional Safety*, Jun. 1992, pp. 32–39.

*Primary Examiner*—Ramon O. Ramirez
*Attorney, Agent, or Firm*—Christensen, O'Connor, Johnson & Kindness

[57] ABSTRACT

Disclosed is a palm rest (94) for use with a computer pointing device such as a computer mouse (99) that minimizes an alleviated posture- and stress-related disorders associated with use of computer devices. The palm rest includes a hand-support section (96) that is V-shaped to allow the finger (97) and thumb (98) of a user to readily access the computer mouse, a platform section (100), and a curvilinear section (102) that couples the hand-support section to the platform section. The curvilinear section allows a user to adjust the height of the hand-support section according to user preference and the heights of individual pointing devices. Also disclosed is a pair of left (161) and right (163) platform sections that, when releasably attached to a computer keyboard (164) or portable computer, provide stability to the computer keyboard. Further, a portable computer (182) is disclosed that includes a base component (184), telescoping component (186) and cavity (194) that work together to house a pointing device (180). The telescoping component is extended outwardly when the pointing device is being used, providing a platform for the pointing device.

25 Claims, 11 Drawing Sheets

PALM REST FOR USE WITH COMPUTER POINTING DEVICES

FIELD OF THE INVENTION

The invention generally relates to personal computers and, more particularly, to devices for minimizing work-related injuries that may result from use of personal computers, and to computer accessories for optimizing a workspace and improving user efficiency.

BACKGROUND OF THE INVENTION

It is well known that the use of computer keyboards for extensive periods of time can cause office workers and others to develop posture- and stress-related injuries, including Carpal Tunnel Syrdrome. Carpal Tunnel Syndrome generally results from stress to the wrist area caused by a combination of wrist posture and chronic repetitive wrist and finger motions. In response to this phenomena, wrist/arm supports have been developed that consist of an elongated pad, which typically is positioned along and adjacent to the front of the keyboard. Instead of a singular elongated pad, separate support pads for each wrist have also been employed. Prior art wrist rests help to relieve posture- and stress-related injuries of keyboard users by supporting the wrist in a position relative to the hand and arm so that the degree of bending at the wrist is decreased, thus decreasing the stress caused by repetitive motion.

While prior an wrist rests may be suitable for use with keyboards, they are not satisfactory when used with computer pointing devices. The popularity of several graphical user interfaces (GUIs) such as Microsoft Widows TM, IBM OS/2 TM and Apple System 7 TM for use with personal computers has resulted in a dramatic increase in the utilization of computer pointing devices, and hence, related injuries. As an example, over 15 million copies of Microsoft Windows TM operating systems have been sold. It has been suggested that Microsoft Windows has had the strongest singular impact on the sale and use of pointing devices in recent years.

While making computers easier to use, the increased use of pointing devices has become a significant co-contributor to the widespread development of posture and repetitive stress-related disorders. Such disorders typically develop in the neck, shoulders, and/or wrists. These disorders can impair comfort, health, and productivity to the point of being disabling. For more information on repetitive stress injuries, please see "The Handling of an Epidemic," published in *Working Woman*, February 1993, pp. 60-65, which is hereby incorporated by reference. For information on ergonomics in the workplace, see "Video Display Terminal Ergonomics," published in *Professional Safety*, June 1992, pp. 32-39, which is also incorporated by reference.

Computer pointing devices have evolved into several primary categories, including the computer mouse, trackballs, joysticks, pens, and additional keyboard keys. The specific advantages and disadvantages of each category vary relative to the intended use, design, and functionality of the pointing device. For example, pointing devices vary relative to their shape, ergonomics, and the employed means of convening tracking movement of the device to movement of a cursor on a computer screen. These characteristics determine the amount of space needed to use the pointing device, the intuitiveness of the device, as well as the time required to perform a pointing task, i.e., the quickness of target acquisition. Greater intuitiveness in directing a cursor motion via the manipulation of a pointing device decreases the time to achieve a comfortable skill level with an unfamiliar pointing device, and results in quicker target acquisition speed. In many cases and for many uses, once a user is comfortable with a pointing device, the speed of the cursor can be accelerated to increase the speed of cursor movement relative to hand movement. This adjustment is made by the user adjusting either the operating system software, through software that accompanies the pointing device, or through a separate software utility. In summary, the speed of target acquisition and the overall efficiency of a pointing device are dependent upon the intuitiveness of the device, the ergonomics of the device, and the relative cursor speed as set by software.

Of the above-described pointing devices, the computer mouse has become the most popular. Computer mice have the advantages of user familiarity and of allowing moderately quick target acquisition. However, there are a number of disadvantages associated with their use. For example, computer mice are usually positioned on a mouse pad or other level and flat surface next to the keyboard. This placement requires a considerable amount of dedicated desk space, which is a limited commodity in typically crowded workspace environments. As a further disadvantage, pointer control using a computer mouse often requires movement of the shoulder and arm, in addition to the wrist, hands and fingers. Furthermore, computer mice must often be lifted and repositioned on the mouse pad in order to properly position the pointer. These extra motions are fatiguing to the shoulder and neck areas and/or irritating to the user's wrist, and can further contribute to Carpal Tunnel Syndrome. Computer mice users tend to rest their wrists on a hard desk surface, the edge of the mouse pad, or the edge of a desk. Irrespective of the chosen resting position, the user's wrist typically rests on a surface that is irritating to the wrist and in a position such that the wrist is forced to bend, both of which are contributing factors to Carpal Tunnel Syndrome.

In comparison to computer mice, trackballs require less desk space and are easily incorporated into computer keyboards and portable computers, e.g., laptop or notebook computers. However, trackballs are typically considered to be less intuitive and more difficult to control than computer mice. Thus, trackballs have slower target acquisition than computer mice. Further, trackballs that are integral with or that attach to portable computers, i.e., miniature trackballs and ball-point mice, have traditionally been of a relatively small size, in order to increase portability and to conserve space around the keyboard. These small trackballs are even more awkward to use than standard trackballs, especially for habitual users of computer mice.

In U.S. Pat. No. 5,131,614 to Garcia et al., a wrist support for alleviating some of the posture- and stress-related problems associated with the use of computer mice is suggested. While it is unclear from the patent, an illustration of a probable construction and use of the Garcia et al. wrist support is shown herein with reference to FIGS. 1 and 2A-2D. A wrist support 20 suggested by Garcia et al. includes a longitudinal pad 22 and base 24 that rests on a desk or other support surface. The longitudinal pad 22 apparently would extend along the front of a keyboard 26 and outwardly from an edge thereof, such that the longitudinal pad 22 may be used in conjunction with a computer mouse 28. As is shown, the keyboard 26 and computer mouse 28 rest on the base 24.

Wrist rests such as that disclosed in Garcia et al. and similar devices have a number of disadvantages. For example, the longitudinal pad 22 does not alleviate the need for shoulder and arm movement during the course of moving the pointing device, especially toward and away from the user. Such movement is illustrated in FIGS. 2A and 2B. This forward and backward movement creates friction between the user's forearm and the wrist rest 20 which, combined with the pressure applied to the wrist area, irritates the wrist tissue and contributes to Carpal Tunnel Syndrome. Furthermore, movement of the arm and shoulder can work the shoulder and neck muscles to the point of aggravation. Also, the chronic repetitive lifting of the arm while using the computer mouse 28 and moving between the keyboard 26 and computer mouse 28 often causes fatigue and aching of the shoulder and neck muscles.

In addition to the disadvantages described above, prior art solutions such as the one suggested in Garcia et al. do not accommodate variations in the vertical positioning of the pointing device and wrist rest relative to the user. This problem is caused by the relative angles between the forearm, wrist, and the pointing device. In turn, the relative angles are affected by the heights of the rest 20 and pointing device 28. Suppose a wrist rest is configured for a normal work surface height as shown in FIG. 2A, but that the rest 20 and computer mouse 28 are moved to a lower position as shown in FIG. 2C, e.g., on the user's lap, or to a higher position as shown in FIG. 2D, e.g., to a higher section of a desk, or on top of a book or other desk clutter. The relationship between the arm, the wrist rest, and the pointing device will change as the wrist rest and pointing device are moved from the work surface. If the wrist rest and pointing device are positioned in a relatively low position, a wrist support that is too short will require the wrist to bend or flex upwardly. Additionally, in such a position the user's upper arm may be forced to lift off the rest in order to effectively use the pointing device, as is shown in FIG. 2C. Conversely, when the wrist rest 20 and pointing device 28 are used in a relatively high position, as shown in FIG. 2D, there is an arching of the wrist and arm, which is uncomfortable, applies more pressure to the wrist, and causes the wrist to bend.

Another disadvantage of prior art solutions such as that described for Garcia et al. is that use of the wrist rest is inconvenient when the keyboard/mouse is placed on the user's lap. Such rests are characteristically bulky and do not join the keyboard and pointing device in a way that is compact and stable on the user's lap. The advantages of placing the keyboard and pointing device on the users lap are multifold, including workspace optimization and improved ergonomics. The workspace is optimized by eliminating the need for a desk to support the keyboard and pointing device, and by enabling the user to shift from one area to another within the workspace. The ergonomics are improved by enabling the arms to hang relaxed, the wrists to posture straight, the elbows and legs to bend 90°, and the feet to be positioned flat on the floor without the need for multiple ergonomic devices. The user only requires a chair of proper height, a computer screen placed at proper height, and a means of supporting the keyboard and pointing device on the lap.

In addition to the disadvantages described above, prior art solutions are not compact, portable and storable in a briefcase for mobile use with a portable computer. Furthermore, the wrist rest portions are not integrated into computer keyboards, portable computers, or computer pointing devices.

There is a need for a support that may be used with computer pointing devices that will minimize posture- and stress-related injuries, including those injuries stemming from shoulder movement and wrist extension/flexion, while still allowing quick target acquisition. It would be advantageous to have a rest that is positioned relatively close to the pointing device. Further, it would be advantageous if the support was configurable to allow it to be joined or integrated into a keyboard, a portable computer, or a pointing device. Integration of a rest with pointing devices will become increasingly important as the popularity of portable computers increases. Further desirable features of a support are compatibility with laptop use, ease of assembly/disassembly and storage, and portability.

SUMMARY OF THE INVENTION

The invention is an apparatus for minimizing posture- and stress-related disorders associated with the use of computer pointing devices. The apparatus comprises: (a) a hand support for elevating the user's hand to a level that is substantially equal to the height of the pointing device, the hand support including a front edge and a back edge; and (b) a support structure for buttressing the hand support, the support structure including first and second sides, which form a recess under the hand support, the first and second sides being a sufficient distance apart to allow the pointing device to move laterally between the first and second sides for adequate control movement.

In accordance with other aspects of the invention, the support structure further includes a back wall that abuts the first and second sides of the support structure and extends upwardly to the back edge of the hand support. A nonskid pad attaches to the underside of the right, left and back walls.

In accordance with still further aspects of the invention, the apparatus includes a component for limiting the movement of the pointing device under the hand support. The component may be, for example, a stop which extends from the back wall to a point approximately midway between the back wall and the front edge of the hand support.

In accordance with further aspects of the invention, the apparatus is adjustable to different heights so as to adapt to the heights of various pointing devices. The apparatus also may include a cushion that is bonded thereto to provide added comfort to the user.

In accordance with other aspects of the invention, the apparatus is adjoined to a computer keyboard or a portable computer.

In accordance with other aspects of the invention, the apparatus may be incorporated into a computer pointing device.

In accordance with other aspects of the invention, the apparatus is incorporated into a computer keyboard or into a portable computer.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DETAILED DESCRIPTION OF THE PREFERRED EMBODIMENT

Figure 1:
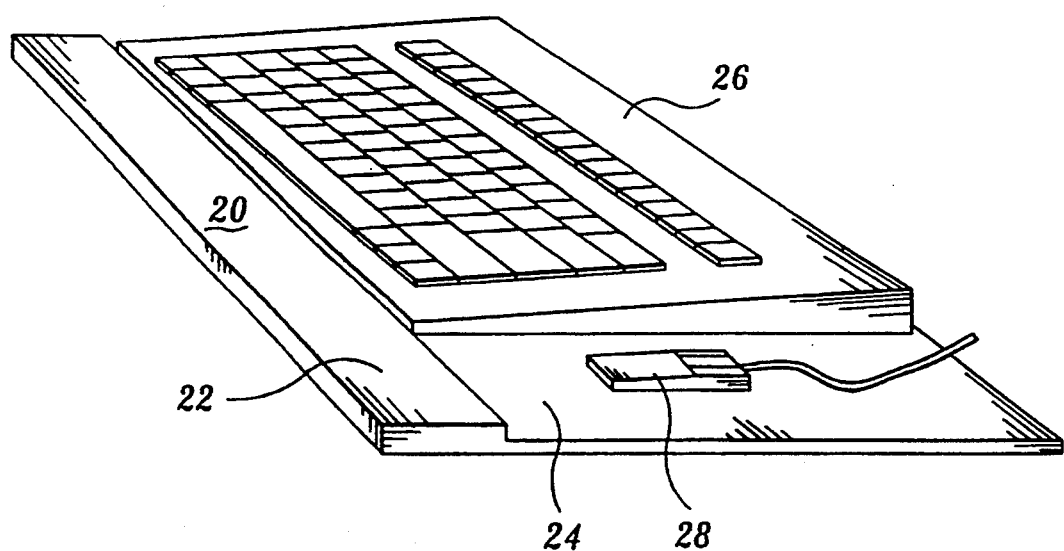
FIG. 1 is a perspective view of a prior art rest for use with a computer mouse.
Figure 2A:
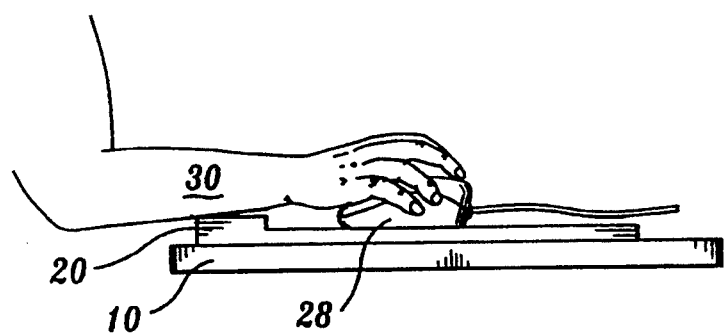
FIG. 2A is a side view of the rest shown in FIG. 1.
Figure 2B:
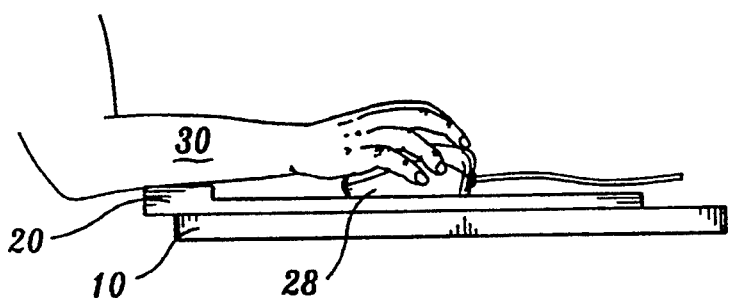
FIG. 2B illustrates the rest and computer mouse of FIG. 2A, where the computer mouse has been moved away from the user.
Figure 2C:
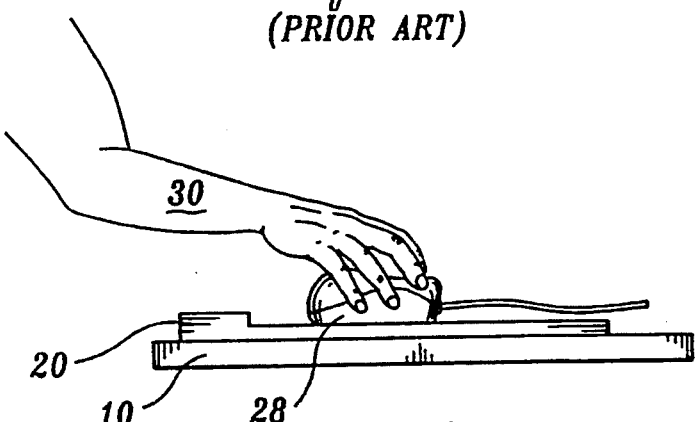
FIG. 2C illustrates the rest and computer mouse of FIG. 2A, where the rest and computer mouse are placed in a low position relative to the user.
Figure 2D:
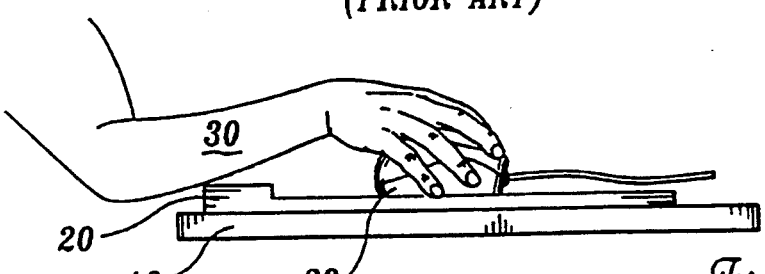
FIG. 2D illustrates the rest and computer mouse of FIG. 2A, where the rest and computer mouse are placed in a high position relative to the user.
Figure 3A:
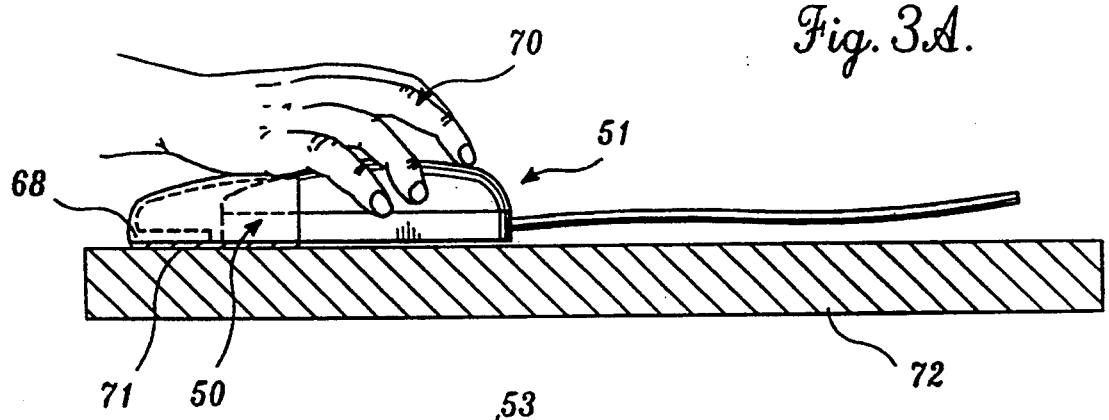
FIG. 3A is a side view of a first exemplary palm rest in accordance with the invention.
Figure 3B:
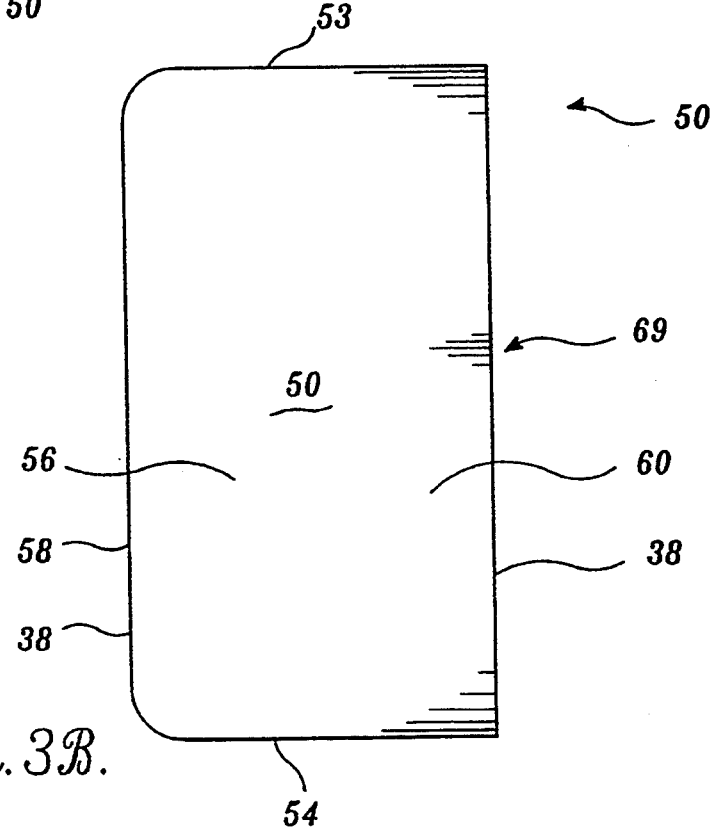
FIG. 3B is a plan view of the palm rest of FIG. 3A.

FIGS. 3A–3C and 4 illustrate a first exemplary embodiment of a palm rest 50 in accordance with the invention. The palm rest 50 reduces posture- and stress-related injuries by encouraging an essentially straight path between the elbow, wrist and hand as a computer pointing device is manipulated, by providing support for the user's arm and palm, and by providing a raised fulcrum to enable finger control of a pointing device. Without the palm rest, a user's wrist must bend to accommodate the computer pointing device. In FIG. 3A, the palm rest 50 is shown in use with a computer mouse 51. In FIG. 4A, a trackball 52 is illustrated as the pointing device.

The palm rest 50 includes side walls 53 and 54 for supporting a curved-shaped hand-support surface 56. The hand-support surface 56 forms a back 58 and top 60 portion of the palm rest. The side walls and support surface collectively form a cavity 62 that can accept at least a portion of a computer pointing device, such as the computer mouse 51 or the trackball 52. The cavity is preferably of sufficient height to allow a pointing device to slide underneath the palm rest, while not being so tall as to unnecessarily increase bending of the wrist. A suitable distance between the pointing device and top of the palm rest is, for example, between 1 and 5 millimeters (mm). Maintaining a suitable distance between the pointing device and the palm rest is important for minimizing bending of the wrist and for allowing the fingers to comfortably reach and maneuver the pointing device.

Figure 3C:
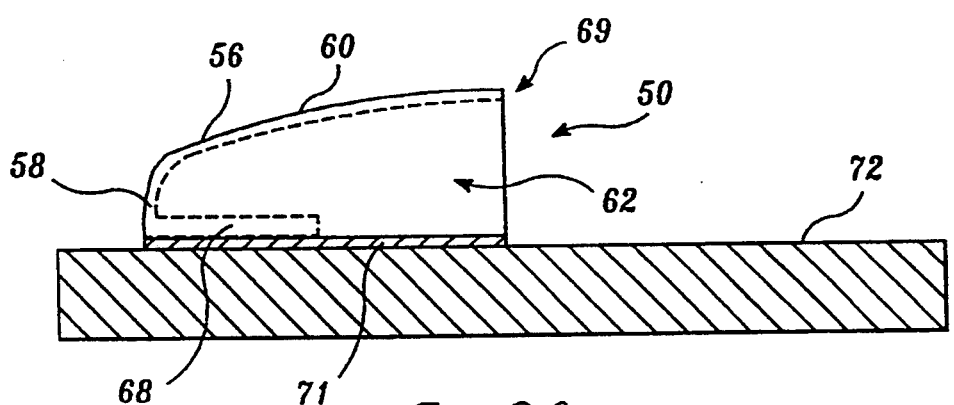
FIG. 3C is a cross-sectional view of the palm rest of FIG. 3B, taken along section line 3B—3B.
Figure 4:
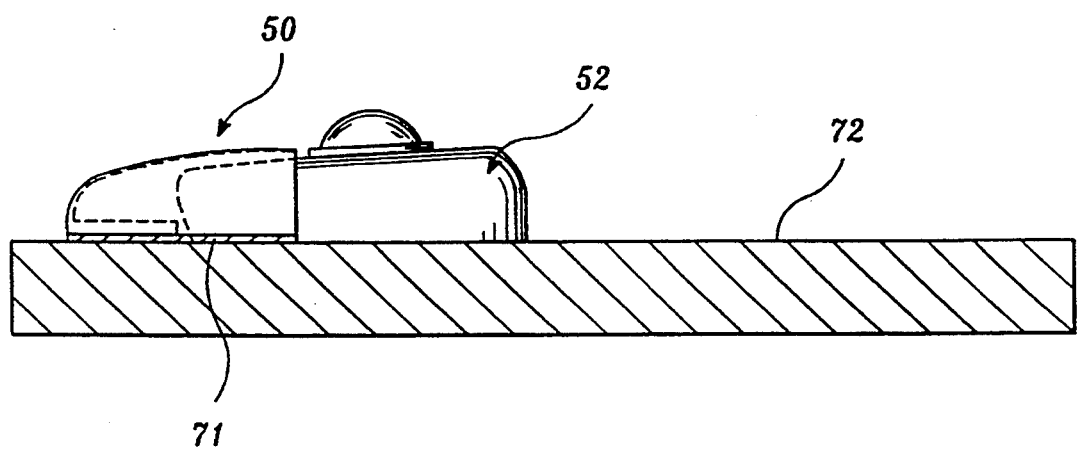
FIG. 4 illustrates use of the palm rest of FIG. 3A with a computer trackball.

Palm rest 50 further includes a bumper or stop 68 that extends from the back 58 of the palm rest 50, along the side walls 53 and 54, and toward a front edge 69 of the palm rest. The stop 68 prevents the computer mouse 51 from being pushed too far under the hand-support surface 56 during mouse manipulations, and thus beyond the reach of a user's fingertips, shown at 70 in FIG. 3A. The length of the stop 68 may depend upon the particular pointing device to be used, and may be adjustable by the user. A non-skid pad 71, partially shown in FIGS. 3A and 3C, is preferably attached to the bottom portions of the side walls and back to prevent the palm rest from sliding around on a work surface 72.

The components comprising the palm rest 50 may be of a number of suitable materials. For example, the side walls 53 and 54, hand-support surface 56 and back wall 58 may be formed as an integral unit from an injection-molded plastic such as polycarbonate and/or ABS (acrylonitrile butadiene styrene) plastic. It is noted that the components comprising palm rest 50 may also be formed in sections, with the sections being subsequently joined together, e.g., by using a suitable adhesive.

The palm rest provides a number of advantages over prior rests to be used with computer mice, and over the use of pointing devices without any type of rest. The palm rest 50 supports the palm slightly above the pointing device while using a computer mouse or trackball, thereby reducing wrist bend—a known contributor to the development of Carpal Tunnel Syndrome. Supporting the palm during pointing device manipulations also supports part of the weight of the arm, thus relieving shoulder and neck muscles, which decreases stress- and work-related injuries to the shoulder and neck areas. The hand-support surface 56 provides a raised fulcrum for the palm, thereby expanding the range and degree of mouse control using the fingers. In this manner, a user's fingers alone can move the computer mouse through approximately the full range of motion needed to access all areas of a computer screen with a cursor. As a result, a user can quickly direct the computer cursor to desired points on the computer screen without moving the elbow and arm to the extent required when the palm rest is not used. Thus, in addition to decreasing factors that contribute to work-related injury, the palm rest increases user efficiency by increasing the speed of target acquisition. Further, finger control is intuitive to users of the palm rest and a computer mouse, enabling quick target acquisition times.

Figure 5A:
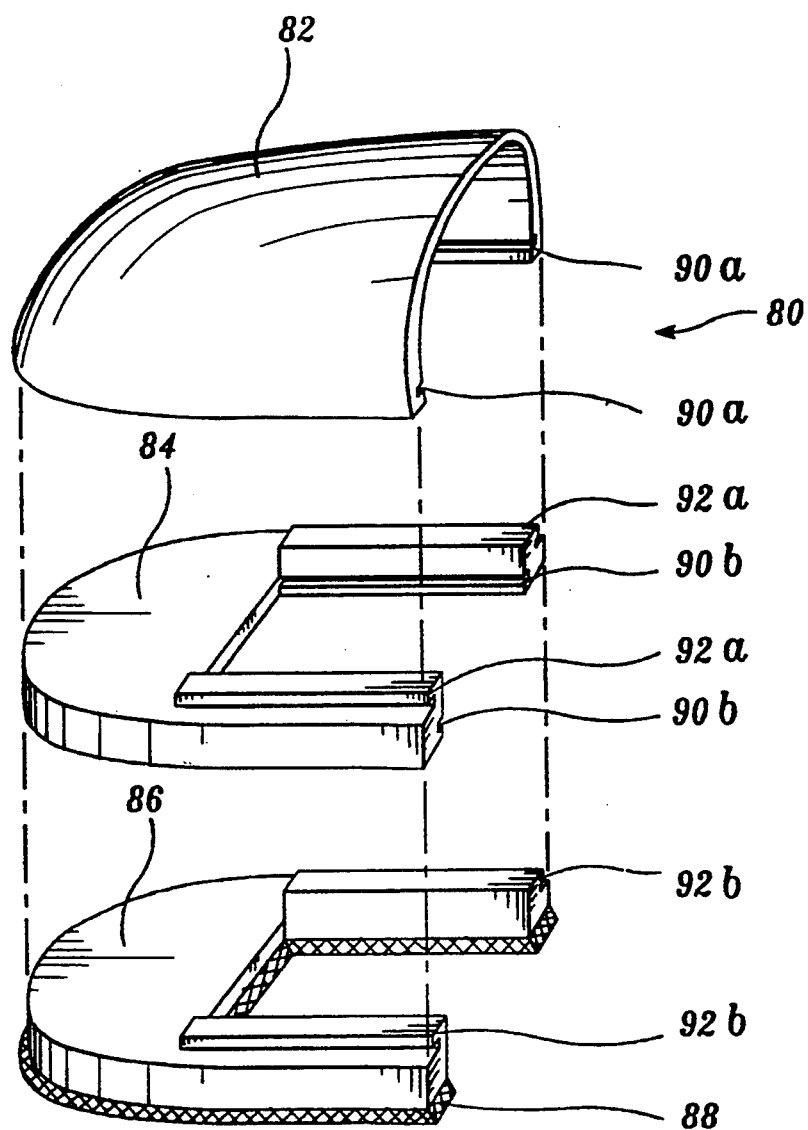
FIG. 5A is an exploded, isometric view of a second exemplary palm rest in accordance with the invention, including a spacer for adjusting the height of the palm rest to accommodate various computer pointing devices.
Figure 5B:
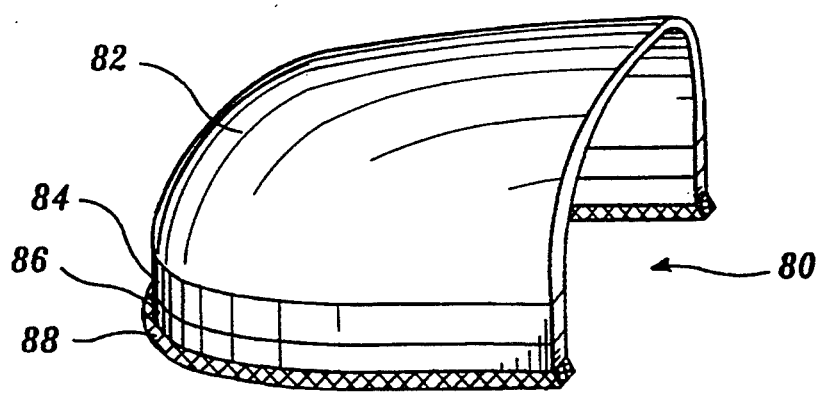
FIG. 5B illustrates the palm rest of FIG. 5A in which the spacer has been joined with the remaining sections of the palm rest.

FIGS. 5A and 5B illustrate a second exemplary embodiment of a palm rest 80 in accordance with the invention. In this embodiment, the height of the palm rest is adjustable to accommodate the varying heights of different computer pointing devices. The palm rest 80 includes a top hand-support section 82, a height-adjustment section or spacer 84, and a bottom section 86. The height of the palm rest 80 is adjustable by adding or removing one or more of the height-adjustment sections 84, although only one height-adjustment section is shown in FIGS. 5A and 5B. The bottom section 86 includes a non-skid pad 88 that is bonded to the underneath of the bottom section to prevent slipping of the palm rest on a workplace surface.

Each of the components comprising palm rest 80 includes either an interlocking ridge 90, a groove 92, or both, which enable the components to be joined together. The top hand-support section 82 includes a groove 90a that interlocks with a ridge 92a on the height-adjustment section 84. The height adjustment section 84 also includes a groove 90b that interlocks with a ridge 92b on the bottom section 86. As will be appreciated by those skilled in the art, other means of attaching the sections may also be used. For example, the sections may be joined by screws, or by a hook and loop fastener, such as that manufactured under the trademark Velcro ™ by Velcro USA Inc. of Manchester, N.H.

FIGS. 6A–6D illustrate a third exemplary palm rest 94 in accordance with the invention. Palm rest 94 functions in a manner similar to the palm rests 50 and 80 disclosed in FIGS. 3A–3C, 4, and 5A–5B, except that the palm rest 94 includes a number of structural differences. More particularly, the side walls 53 and 54 of palm rest 50 have been removed to provide a cantilevered-type structure that allows expanded lateral movement of a computer mouse, shown most clearly in FIG. 6A. Also, the palm rest 94 has a convenient height-adjustment feature, described below. Other features will become apparent from the following discussion.

The palm rest 94 includes a hand-support section 96 that may be described as having a "blunted" V-shape that allows the fingers 97 and thumb 98 of a user to bend around the palm rest to reach a computer mouse 99. This feature enables expanded motion of the fingers 97 and thumb 98 while manipulating the pointing device. The blunted V-shape of the hand-support section also improves comfort for people with smaller hands.

The palm rest 94 further includes a platform section 100 that is a stabilizing base for the hand-support surface 96 and a somewhat flexible curvilinear perimeter section 102 that couples the hand-support section 96 and the platform section 100. The platform section 100 also serves as an integrated mouse pad for the computer mouse 99. A ridge 104 extends around the periphery of top surface 105 of the platform section 100 to help keep the computer mouse on the platform section during mouse manipulations, if the mouse is bumped, or if the palm rest 94 is resting at a moderate angle. The palm rest 94 also includes platform feet or pads 106a and 106b that support the platform section 100. In cross-section, the palm rest 94 is shaped similar to a hook, as is shown in FIG. 6D. The hand-support section 96 and platform section 100 form an angle $\theta$ that is user adjustable to compensate for computer pointing devices of various heights, the benefits of which are described above with regard to FIGS. 5A & 5B. Although not shown, it is noted that some users may also prefer to raise the end of the platform section that is opposite the hand-support section 96 because it may further decrease bending of or stress to the wrist. This may be accomplished by providing adjustable platform feet 106, e.g., removable and reattachable thicker and thinner platform feet 106b.

The basic components of the palm rest 94 may be constructed using the following: a rigid core 108 that is fabricated in the general shape of the palm rest, a cushion 110 that is attached to an outer surface 112 of the rigid core to form the hand-rest section 96, and a fabric sleeve 114 that either partially or wholly encases the rigid core 108 and cushion 110. The rigid core 108 may be fabricated from aluminum, thermoform plastic or from other appropriately rigid, but somewhat pliant, material. The rigid core may also be constructed of the rigid materials that are joined by a pliant material that forms the curvilinear section 102. In a preferred embodiment, the rigid core 108 is fabricated from aluminum 5052 H32 that is 0.050 inch thick. It has been found that this particular grade, temper and thickness of aluminum is of sufficient stiffness to support the weight of the user's hand and arm, and yet is sufficiently pliant so that the user can bend the aluminum to modify the angle $\theta$, thereby adjusting the height of the hand-support section 96 to the optimal height for any particular pointing device being used.

The cushion 110 may, for example, be of a pressure molded EVA (ethylene vinyl acetate) that is bonded to the rigid core 108 Other materials that may be used to fabricate the cushion 110 include a loose fill material, soft-molded plastic, or a silicone gel packet. As an alternative to the cushion 110, the hand-support section 96 may be contoured aluminum in a shape that is comfortable and supportive to the user's palm. In this case, cushioning preferably provided by a non-contoured EVA foam sheet, a neoprene sheet, an open cell foam, or other such resilient material. The fabric sleeve 114 may be fabricated primarily from a low-friction moisture-absorbing material, such as a four-way stretch spandex, e.g., Lycra ™ or nylon. The fabric sleeve 114 may be attached to the rigid core 108 by an adhesive such as a pressure sensitive adhesive (PSA) tape veneered to all or a portion of the surfaces of the rigid core 108. In one embodiment, a section of the fabric sleeve 114 is releasably attached to the rigid core 108 such that the sleeve may be removed, washed, and subsequently reattached.

The perimeter ridge 104 is created by forming a seam in the fabric sleeve 114. As an alternative, the perimeter ridge 104 may be created, for example, by a ridge stamped into or molded onto the material comprising the rigid core 108, or a ridge that is first fabricated of plastic, foam or other material and subsequently attached to the rigid core. A bumper or stop 116 that prevents the computer mouse from being pushed too far beneath the hand-rest section 96 may also be formed by a seam sewn into the fabric sleeve 114. The platform feet 106 are bonded or sewn to the outside of the fabric sleeve 114 and are preferably fabricated from a non-skid material such as synthetic rubber or closed cell foam.

Figure 6A:
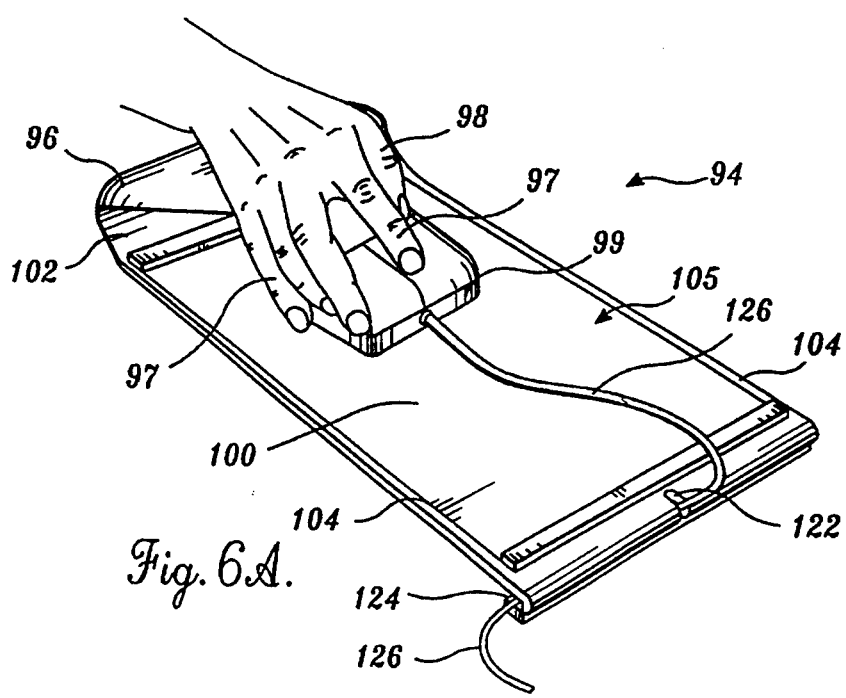
FIG. 6A is a perspective view of a third exemplary palm rest in accordance with the invention.
Figure 6B:
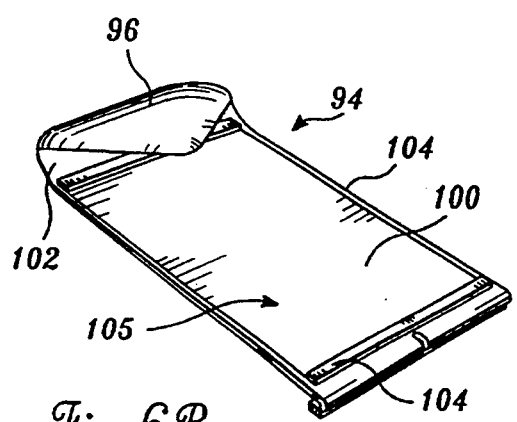
FIG. 6B illustrates the palm rest of FIG. 6A without the hand of a user.
Figure 6C:
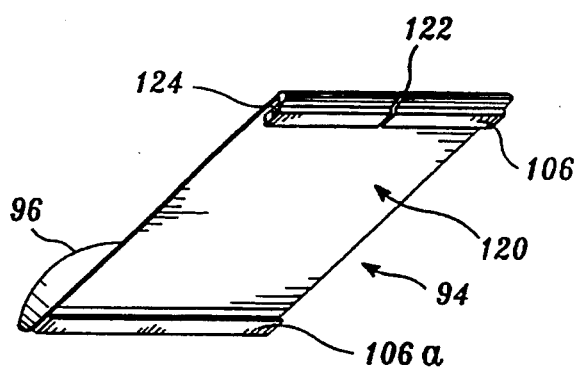
FIG. 6C illustrates the underside of the palm rest of FIG. 6A.
Figure 6D:
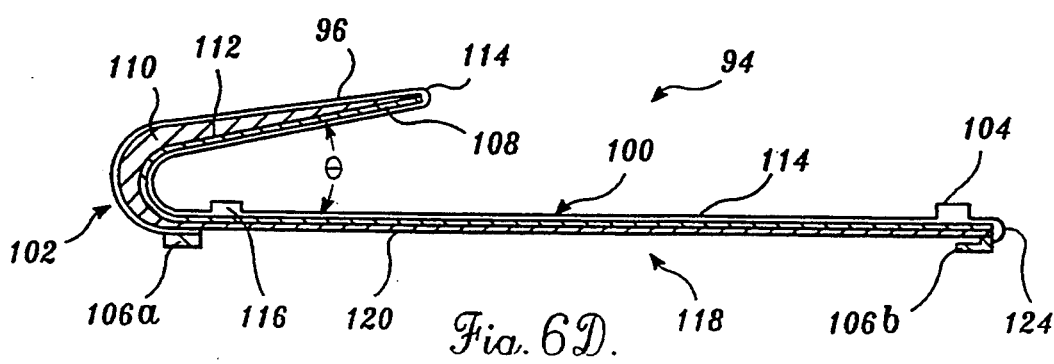
FIG. 6D is a cross-sectional view of the palm rest of FIG. 6A.

In the embodiments shown in FIGS. 6C and 6D, the portion of fabric sleeve 114 that covers a lower surface 118 of the platform section 100 is composed of a hook and loop fastener 120, such as that sold under the trademark Velcro TM. The hook and loop fastener 120 may be used to attach the palm rest 94 to a cantilevered platform section, as disclosed below in FIGS. 9A and 9B and accompanying text. Further, at the end of the platform section, opposite the curvilinear section, a top portion of the fabric sleeve preferably extends around the back edge of the palm rest and releasably attaches to the bottom surface of the platform section. The attachment may be made, for example, with a suitable hook and loop fastener, such as Velcro TM. This portion of the downturned sleeve defines a slot 122 and channel 124 to serve as a cord guide for a cord 126 that couples the pointing device, e.g., computer mouse 99, to a computer (not shown). This configuration is illustrated most clearly in FIG. 6A. Other suitable means of containing and directing the pointing device cord 126 may also be used, such as a channel molded into the end of the platform section, a coil attached to the platform section, or reversed hooks contoured into the edge.

The illustrated design of the palm rest 94 has a number of features that augment the functions of the palm rest. The blunted "V" shape of the hand-support section and the side cutouts also provide for an expanded range of motion, for a palm rest that adapts to a broader range of hand sizes, and allow a broader range of motion than the embodiment shown in FIG. 3A. The platform section 100 provides a support surface for the computer mouse and thus enables moving the palm rest and mouse as a unit. Further, the palm rest and computer mouse may be attached to a computer keyboard or to a laptop computer, as disclosed below in FIGS. 9A and 9B and accompanying text. The construction of the rigid core 108 allows a user to adjust the height of the palm rest to adapt to various heights of pointing devices. The cushion and fabric sleeve relieve stress to the palm tissues. The fabric sleeve also enhances user comfort by absorbing perspiration and providing a comfortable low-friction surface. The fabric sleeve also provides a suitable degree of friction for the pointing device. The perimeter ridge 104 helps to prevent the pointing device from falling off the section platform 100. The platform feet 106 help to prevent the palm rest from sliding around on a work surface. Finally, the cord guide created by channel 124 decreases the torquing and tug acting upon a mouse by the cord 126 as the computer mouse is manipulated.

Figure 7A:
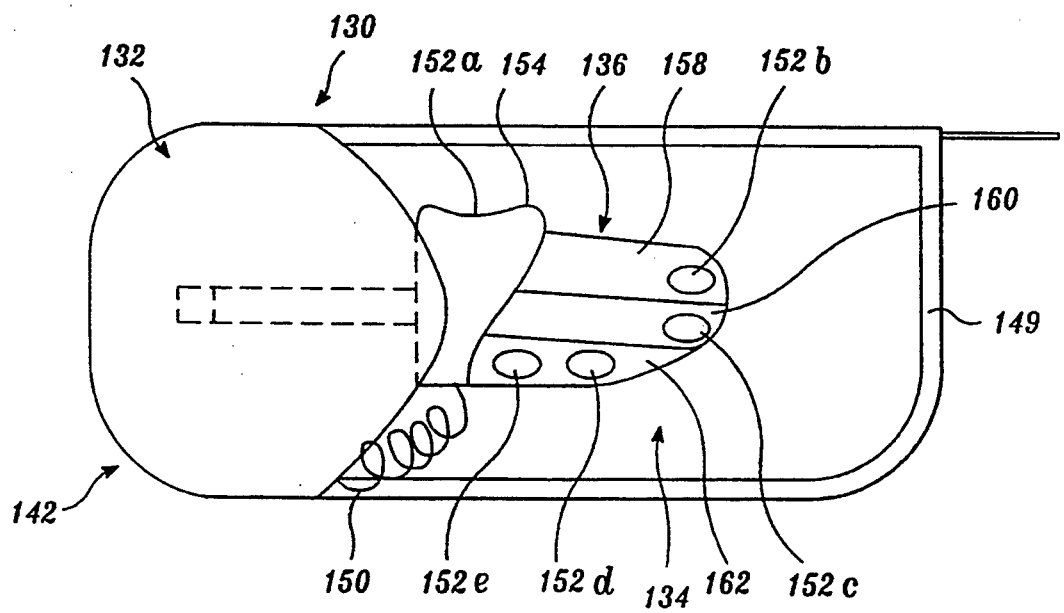
FIG. 7A is a plan view of a fourth exemplary palm rest in accordance with the invention, in which a tracking component has been integrated into the palm rest.
Figure 7B:
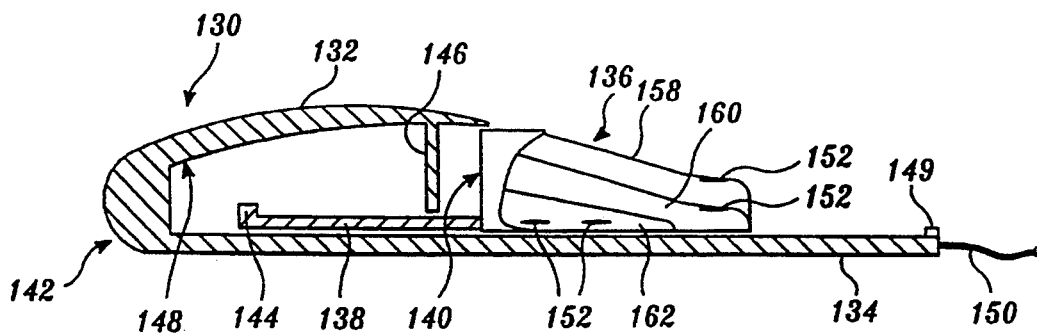
FIG. 7B is a sectional side view of the palm rest of FIG. 7A.

FIGS. 7A and 7B illustrate a fourth exemplary palm rest 130 in accordance with the invention. As in the embodiment shown in FIGS. 6A–6D, the palm rest includes a hand-support section 132 and a platform section 134 that function in the same manner as those described above. In addition, the palm rest 130 integrates a mouse-like motion tracking component 136 that may be used in lieu of traditional computer pointing devices. The motion tracking component 136 rests on the platform section 134. The motion tracking component includes a tail-like projection 138 that extends from a back side 140 thereof toward a back end 142 of the palm rest 130.

The projection 138 includes a vertical section 144 at the end thereof that engages a wall 146, which extends downwardly from an underside 148 of the hand-support section 132. The projection 138 and wall 146 cooperatively work to prevent the motion-tracking component 136 from falling off the platform section 134 when the platform is severely bumped or tilted. As shown in FIG. 7B, the platform section 134 also includes a perimeter ridge 149 that limits movement of the motion tracking component 136 caused by slight tilting or bumping of the palm rest 130. A cord 150 couples the motion tracking component 136 to a computer (not shown).

Those skilled in the art will appreciate that the motion tracking component may have any of a number of tracking means currently known or not yet developed, including mechanical, optical, opto-mechanical, touch pad, digitizing means and other means. Further, while the embodiment of the palm rest 130 and motion tracking component 136 incorporates a tail to prevent it from being separated from or falling off the platform section 134, other means of attachment or retention may be used. Also, a motion tracking component may be incorporated that rests above or that is wholly housed within the platform section, such as a digitizer, or partially housed in the platform section in which moveable members are slidably attached to enable horizontal planar motion and motion tracking within a housing. One example of this general category of partially housed motion tracking devices is the Felix TM mouse by Altra TM. Finally, the motion tracking component 136 can communicate through infrared communications or radio frequency (RF) signals, rather than using the cord.

As a further optimization of the concepts herein disclosed, the motion tracking component 136 incorporated into the palm rest 130 has a functional shape. The purpose of the shape is to allow the fingers, hand, wrist and arm to rest on the component in a relatively non-stressful and non-fatiguing position. This function is accomplished by having the hand rest in a slightly rotated and laterally angled position. Further, the lateral and top surfaces of the motion tracking component include a housing and button switches that have ergonomic function in their individual and combined shape. The embodiment shown is an ergonomic shape for use by the right hand. The tracking component may also be shaped for the left hand, or be shaped for ambidextrous use. The shape for ambidextrous use includes bilaterally placed planar levels and depressions to engage the thumb, index, middle, ring and little finger distal phalangeal pads.

In a preferred embodiment, support surfaces for the distal phalangeal pads include depressions that engage the distal phalangeal pads of the fingers, such that light passive pressure of the fingers laying on the motion tracking component 136 can adequately position the motion tracking component during control movements. A depression 152a, on a medial lateral housing wall 154, receives the thumb distal phalangeal pad. A depression 152b, on a higher plane 158 of upper surface of the motion tracking component 136, receives the distal phalangeal pad of the index finger. A depression 152c, on a mid-level plane 160 of the upper surface of the tracking component 136, receives the distal phalangeal pad of the middle finger. Depressions 152d and 152e, on a lower plane 162 of the upper surface of the motion tracking component 136, receive the distal phalangeal pads of the ring and small fingers.

The illustrated palm rest 130 with its integrated motion tracking component 136 has a number of advantages over a separate palm rest for use with traditional pointing devices. For example, the size and shape of each component, and the materials used for each component may be optimized. The ergonomic shape allows the fingers, hands, wrists and arm to rest in a supported, relatively non-fatiguing position, with the wrist straight, the forearm slightly rotated and angled laterally, and the fingers naturally falling onto corresponding ergonomically positioned and shaped surfaces. The palm of the hand is thus supported by the palm rest 130, and the distal phalangeal pads of the fingers are supported such that the hand spans the motion tracking component in an unrestricted manner. This layout enables user control movements limited to flexion, extension, abduction and adduction of the fingers to move the motion tracking component through a full range of motion. In a preferred embodiment, the upper surface of the motion tracking component 136 has depressions or finger wells 152 for engaging the fingers. These finger wells 152 enable the fingers to more effectively control the movement of the motion tracking component. Thus, the intuitive pointing of the fingers for controlling cursor movement is further optimized. It is noted that the palm rest 130 with integrated motion tracking component has applicability outside of traditional computer oriented applications, and may be used in various applications, e.g., industrial, military, games, and as a general system control device.

Figure 8:
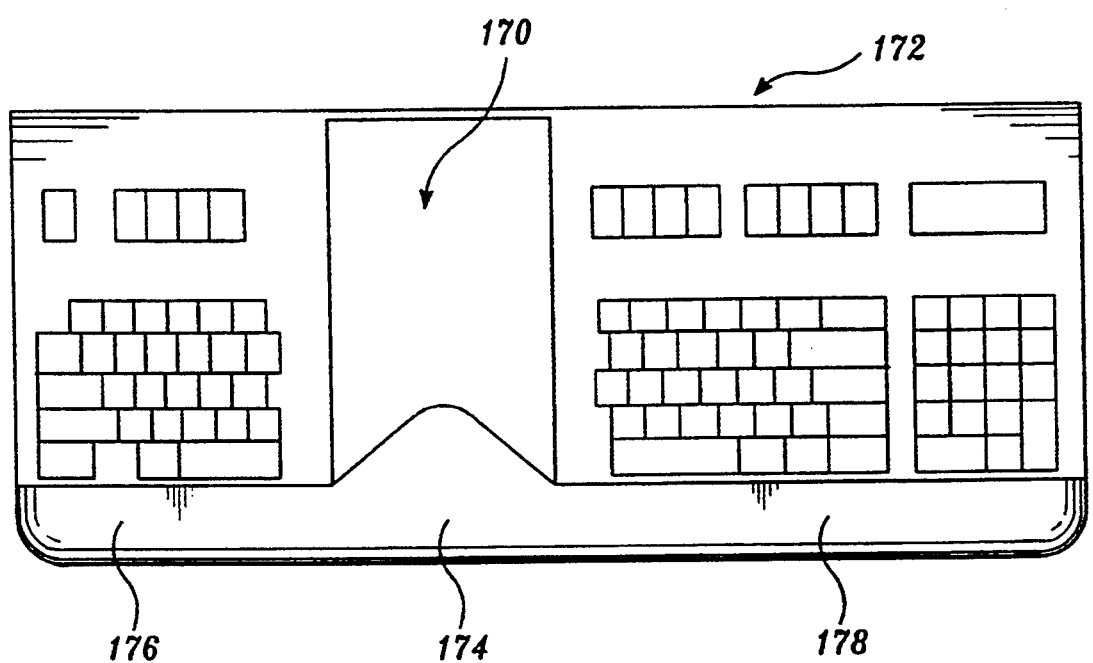
FIG. 8 is a plan view of a fifth exemplary palm rest in accordance with the invention in which the palm rest has been integrated into a computer keyboard.

FIG. 8 illustrates a palm rest 170 that is similar to the palm rest 94 of FIGS. 6A–6D except that it is integrated into the midsection of a split (ergonomic) keyboard 172. In addition to a hand-support section 174 that functions in the same manner as those described above, the palm rest 170 also includes left 176 and right 178 keyboard palm rest sections. Preferably, non-skid rubber pads (not shown) are attached to the bottom of the keyboard 172 to prevent the keyboard from sliding around on a work surface or on a users lap. Also, either the palm rest 170 or the bottom of the keyboard (not shown) may include means to level the keyboard 172 on a user's lap, as described below in FIGS. 9A and 9B and accompanying text.

The integration of the palm rest 170 with the keyboard 172 enables using a traditional pointing device and keyboard as an integral unit, thereby incorporating at least some of the advantages disclosed above. Also, such a configuration may be constructed to be of a sufficiently low profile and narrow length so as to fit into standard suspended keyboard work platforms common to many computer workstations. Placement of the palm rest 170 between the keyboard sections 176 and 178 enables ambidextrous use of the pointing device on the palm rest.

Configured as a unit, the relationship between pointing device and keyboard is more easily learned and thus increases worker efficiency. Many workspaces are spread-out, cluttered, or confined. The integrated unit enables moving the keyboard and a preferred pointing device together about the workspace from one work area to another. The combined unit can be used on a cluttered work surface, on top of papers and books or used while cantilevered over the edge of a desk. Additionally, the combined unit is stable, comfortable, and ergonomically correct on the user's lap (i.e., it encourages the users arms to hang relaxed, with the wrists straight, elbows and legs bent 90°, and feet flat on the floor). Furthermore, the need for dedicated keyboard workspace is eliminated by enabling the keyboard and pointing device to operate on the user's lap. The low profile of this configuration enables it to function on the desktop, on a sub-desk suspended keyboard platform, or on the user's lap near a desk.

Figure 9A:
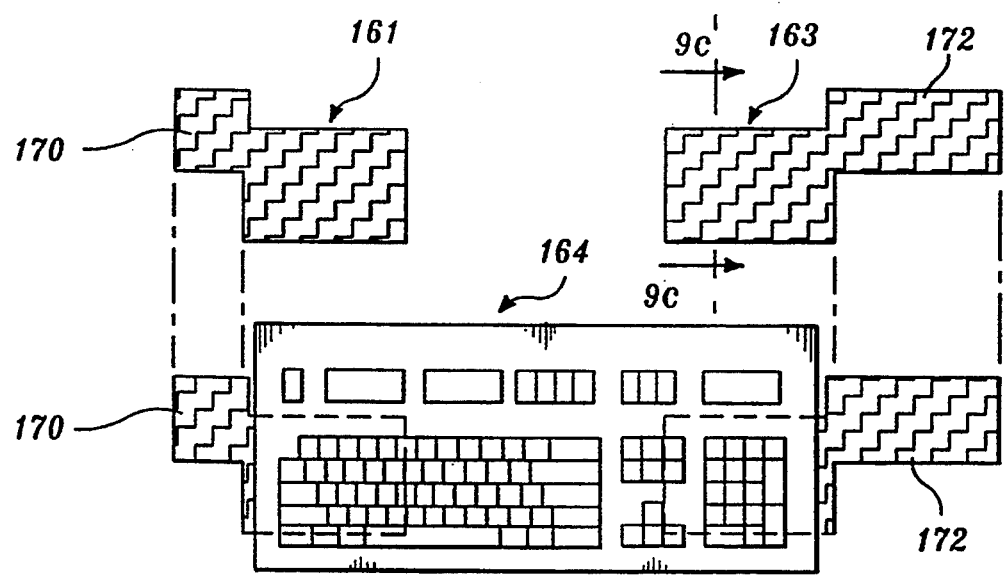
FIG. 9A is a plan view of a set of platform sections that may be attached to a computer keyboard in accordance with the invention to provide stability to the computer keyboard when placed on a users lap and which allow a palm rest to be attached adjacent the computer keyboard.
Figure 9B:
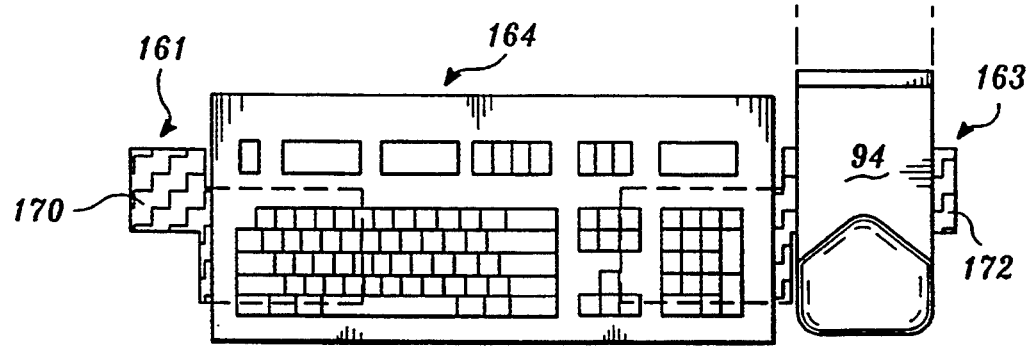
FIG. 9B illustrates attachment of the palm rest of FIGS. 6A–6D with the platform sections and computer keyboard of FIG. 9A.
Figure 9B:
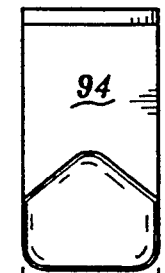
Figure 9C:
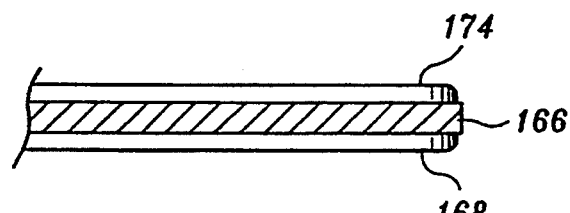
FIG. 9C is a cross-sectional view of the platform sections of FIG. 9A, taken along section line 9C—9C.

A common characteristic of the large number of computer keyboards and portable computers in use is that they do not sit comfortably or with stability on a typical user's lap. In addition, for laptop use, computer users have traditionally been forced to compromise by using computer pointing devices that are relatively awkward to use, or which must be positioned in inefficient or stress-inducing locations relative to the keyboard and the user. Additionally, pointing devices that have been developed for portable computer users are typically disadvantageous because they require a transition from non-laptop pointing devices, have slower target acquisition times, and as a result of their size, are typically fatiguing to use. Conventional keyboards and portable computers also generally do not have the capability of being integrated with the more popular and user-friendly computer pointing devices, e.g., computer mice and conventional trackballs. FIGS. 9A, 9B and 9C illustrate a device for adapting conventional keyboards and portable computers to operate adjoined with pointing devices on a user's lap.

FIGS. 9A, 9B and 9C illustrate a pair of left and right platform sections 161 and 163 that may be used with a computer keyboard 164 or portable computer (not shown) to provide stability when the computer keyboard or portable computer is used on the lap. Further, as disclosed below, the platform sections allow the integration of computer accessories with the computer keyboard 164 or a personal computer. For example, by allowing attachment to the palm rest 94 disclosed in FIGS. 6A–6D, the platform sections enable the advantages of the palm rest to be enjoyed while using a keyboard or portable computer on the lap. This feature is shown in FIG. 9B.

As shown in FIG. 9C, each platform section 161 and 163 includes a rigid core 166 that may be fabricated of any suitable material, such as aluminum, pressboard, e.g., tempered masonite, or a glass-filled nylon. To increase stability as the unit rests on the work surface or a user's lap, a nonskid material 168, such as synthetic rubber or neoprene is bonded to the underside of the rigid core 166. To further increase stability, the left platform section 161 has an offset section 170 that positions the platform section nearer to a user's let knee (not shown) when the computer keyboard is placed on the lap. The right platform section 163 also includes an offset section 172 that provides greater stability when attaching computer accessories such as the palm rest 94, as opposed to simply having a platform section that is straight and thus that extends outwardly from the middle of the computer keyboard. As will be appreciated, the platform sections are small and light-weight so as to be portable and compactly storable with a portable computer.

The platform sections 161 and 163 preferably attach to the computer keyboard 164 or personal computer using a hook and loop fastener 174 such as Velcro ™. The hook and loop fastener is bonded to the top surface of the platform sections as well as to the underside of a computer keyboard 164 or a portable computer. In addition to the palm rest 94, other attachable accessories may include, for example, document holders, AC adapters, floppy disk boxes, lamps, joysticks or other game controllers. Furthermore, in accordance with the invention, a platform section that extends elsewhere from underneath the computer keyboard or a portable computer may be implemented as desired for the particular accessory to be used.

The use of a releasably attachable mechanism to fasten the platform sections to the computer keyboard and to couple computer accessories, such as the palm rest 94, to the platform sections allows users to position the device where it is most comfortable for each workplace setting. Moreover, the palm rest 94 can be quickly assembled and disassembled from the platform section 163 for compact and portable storage in a briefcase. This portability enables the use of a conventional computer mouse with a portable computer in the varied settings typical of portable computing, with many of the desirable attributes disclosed above in regard to FIGS. 3A–8. It is noted that the platform sections 161 and 163 may be designed to allow placement of the palm rest 94 or other accessories on either side of a computer keyboard or portable computer. One way to enable ambidextrous placement is to shape the left platform section 161 to mirror the right platform section 163, thus enabling either side to support the palm rest.

FIGS. 10A, 10B, 11, and 12 illustrate the integration of a pointing device 180 into a portable computer 182 in accordance with the invention. The portable computer 182 includes a base component 184 and a right telescoping component 186 that is slidably coupled to the base component. Each of the base and telescoping components 184 and 186 includes a palm rest 188 and 190, respectively, that helps to alleviate posture- and stress-related injuries while using the portable computer 182 and pointing device 180. The right telescoping component 186 further includes an upper surface 191 that supports the pointing device 180 both when the pointing device is being used and in storage. The pointing device 180 is coupled to the portable computer 182 by a cord 192.

Figure 10A:
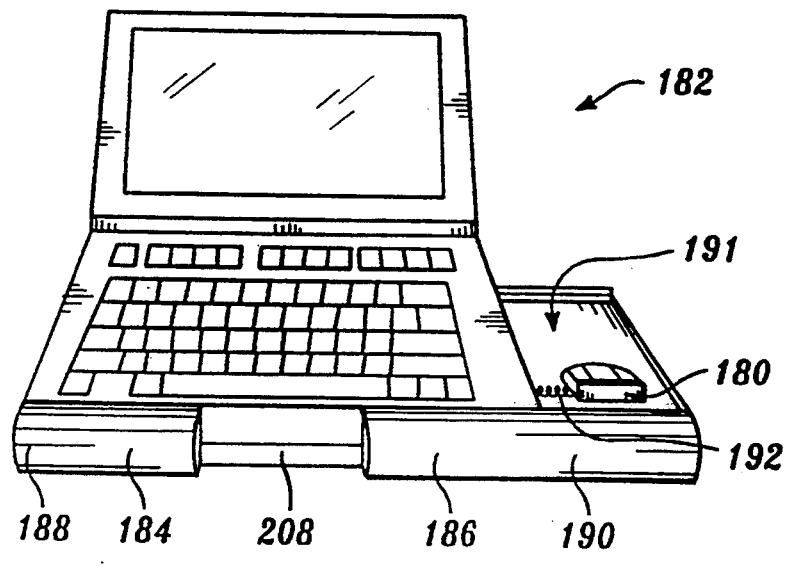
FIG. 10 A is a perspective view of a sixth exemplary palm rest and motion tracking component in accordance with the invention, in which the palm rest and motion tracking component are integrated with a portable computer.
FIG. 10B illustrates the motion tracking component of FIG. 10A in a stored position.
Figure 10B:
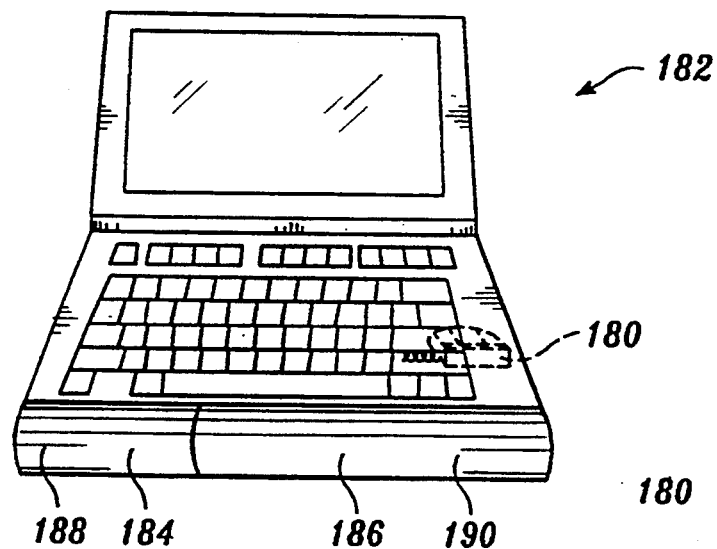
Figure 11:
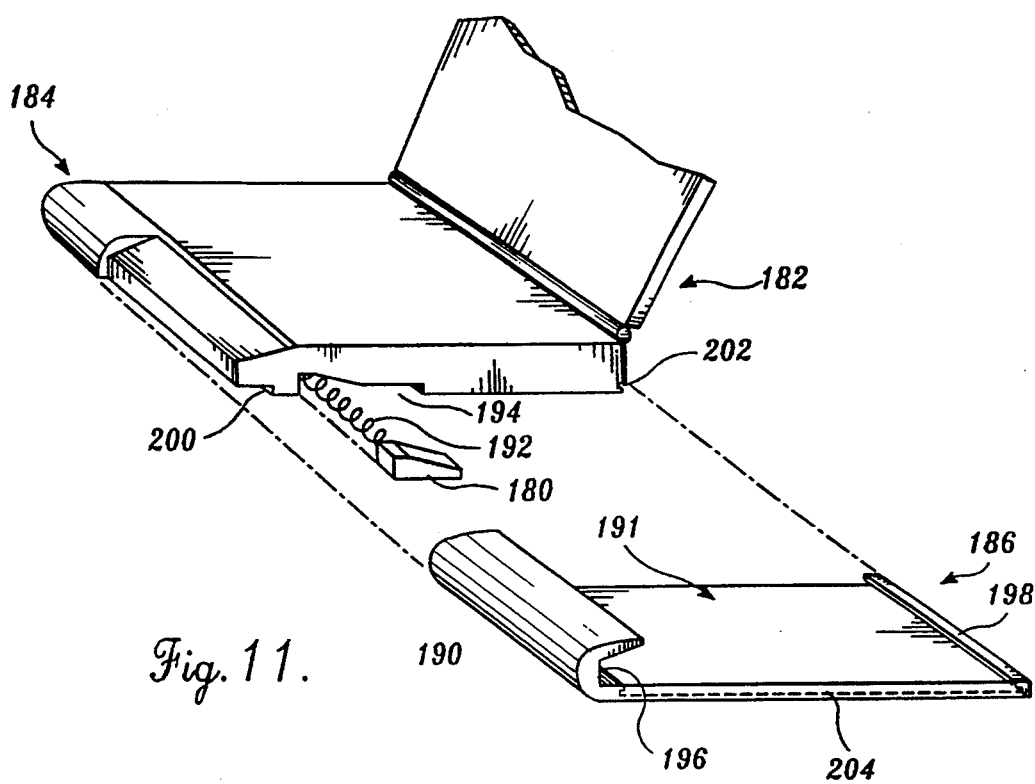
FIG. 11 is an exploded isometric view of the palm rest and motion tracking component of FIG. 10A.
Figure 12:
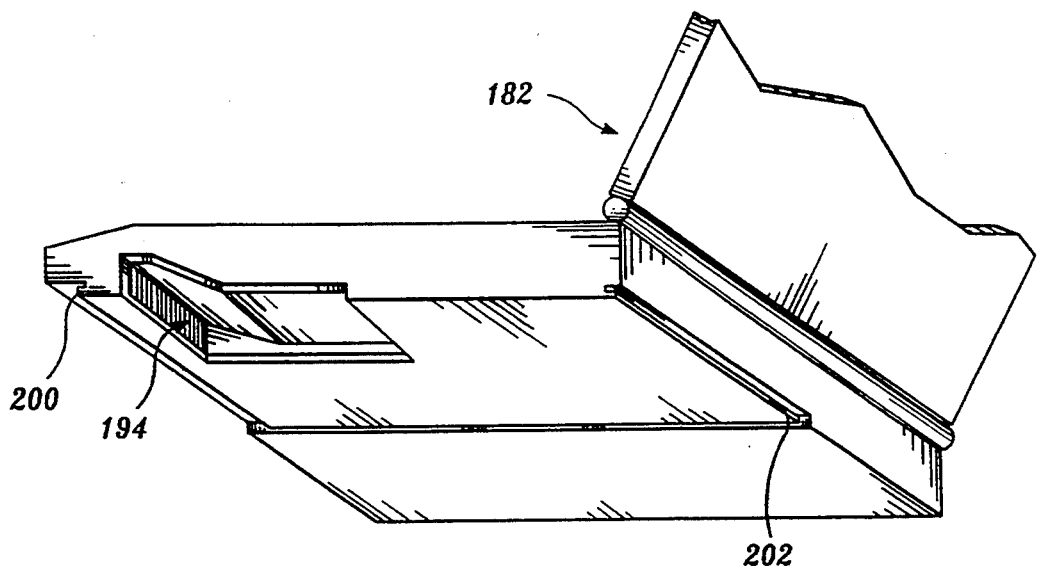
FIG. 12 illustrates a cavity in the portable computer of FIGS. 10A, 10B and 11 for accepting the motion tracking component.

The portable computer 182 further includes a cavity 194 for accepting the pointing device 180 when the pointing device is not being used and the telescoping component 186 is in a closed position, as shown in FIG. 10B. To use the pointing device 180, a user simply extends the telescoping component 186 from the base component 184, exposing the pointing device 180 and a portion of the cord 192. The cavity 194 is shown most clearly in FIG. 12. As will be appreciated, the size and shape of the cavity may be adapted to the particular pointing device that is to be utilized with the portable computer 182. The decreasing size of computer components, including computer boards, hard drives, and disk drives, enables a cavity such as the cavity 194 to be incorporated into portable computers.

Looking more particularly at the base and telescoping components, the telescoping component 186 includes front and back rails 196 and 198 that engage front and back slots 200 and 202, respectively, in the base component 184. The telescoping component 186 also includes an endwall 204 that contains the pointing device 180 during use and when positioning the pointing device into the cavity 194 during storage. When the telescoping component 186 is in its closed position, it will nearly abut the base component 184. As will be appreciated, means for keeping the telescoping component in a closed position, and for ensuring that the telescoping component does not inadvertently separate from the portable computer 182, may also be included. Further, the space 208 between the palm rests 188 and 190 that is exposed when the telescoping component is extended outwardly is preferably also padded to provide support for the wrists should they come into contact with this area during computer use. The edges surrounding the space 208, which are illustrated as angular to more clearly illustrate the disclosed features, may be smoothly curved to decrease irritation to the hands or wrists should they come into contact with those areas.

Those skilled in the art will appreciate that the motion tracking component within the pointing device 180 may have any of a number of tracking means currently known or yet to be developed, including mechanical, optical, opto-mechanical, touch pad, digitizing means, or other means. Further, the pointing device 180 can interface with the portable computer 182 with infrared or radio frequency (RF) signals rather than by using cord 192.

The integration of the laterally deployable palm rest section 186 and pointing device 180 into a portable computer incorporates many of the features disclosed in FIGS. 3–8 above in a configuration that is easily portable, storable, and quickly deployable.

While preferred embodiments of the invention have been illustrated and described, it will be appreciated that various changes can be made therein without departing from the spirit and scope of the invention.

The embodiments of the invention in which an exclusive property or privilege is claimed are defined as follows:

1. An apparatus for use with a computer pointing device, the apparatus minimizing posture- and stress-related disorders associated with the use of the computer pointing device, the apparatus comprising:
   a base that includes an upper surface upon which the computer pointing device may rest;
   a palm support section for supporting a user's palm, the palm support section extending over a portion of the upper surface of the base to allow at least a part of the pointing device to be positioned between the palm support section and the upper surface of the base; and
   means for coupling the palm support section to the base.

2. The apparatus of claim 1, wherein the palm support section is generally V-shaped.

3. The apparatus of claim 1, wherein the means for coupling is adjustable to allow a distance between the palm support section and the upper surface of the base to be varied in response to user preferences and to accommodate different sizes and types of pointing devices.

4. The apparatus of claim 1, further including means for limiting movement of the pointing device beneath the palm support section.

5. The apparatus of claim 1, further including an integral motion tracking component.

6. The apparatus of claim 1, wherein the base comprises a single substantially elongate metal strip, including a planar section; the means for coupling comprises a curvilinear section, extending from an end of the planar section; and, the palm support section comprises a triangular-shaped section that extends outwardly from the curvilnear section over the planar section.

7. The apparatus of claim 6, further including a fabric sleeve that at least partially encases the metal strip.

8. The apparatus of claim 7, further including a pad positioned between the fabric sleeve and the palm support section.

9. The apparatus of claim 8, further including a ridge that extends around a periphery of the base.

10. The apparatus of claim 1, further including means for coupling the base to at least one of a computer keyboard and a portable computer.

11. The apparatus of claim 10, wherein the means for coupling includes a platform section, including a first area for contacting a bottom portion of the keyboard or computer, and a second area that extends outwardly from the first area to provide a surface upon which the base may rest.

12. The apparatus of claim 11, wherein a hook and-loop fastener is attached to the means for coupling and the base, to allow the base to be releasably attached to the means for coupling.

13. The apparatus of claim 1, wherein the computer pointing device includes a multidirectional detection device for controlling an on-screen indicator and wherein movement of the computer pointing device on the base actuates the multidirectional detection device.

14. The apparatus of claim 1, wherein the distance between the palm support section and the upper surface of the base is at least slightly greater than the height of the pointing device, allowing the pointing device to be moved relative to the apparatus during use.

15. An apparatus for use with a computer pointing device, the apparatus minimizing posture- and stress-related disorders associated with the use of the computer pointing device, the apparatus comprising:
  a hand support, including a front edge and a back edge, for elevating a user's hand to a level that is substantially equal to the height of a pointing device; and
  support means for buttressing the hand support, the support means including first and second sides which form a recess under the hand support, the first and second sides being a sufficient distance apart to allow the pointing device to extend at least partially underneath the hand support, between the first and second sides.

16. The apparatus of claim 15, wherein the support means further includes a back wall that abuts the first and second sides of the support means and extends upwardly to the back edge of the hand support.

17. The apparatus of claim 16, further including a nonskid pad positioned between the first and second sides of the support means and extending outwardly from the back wall of the support means.

18. The apparatus of claim 15, further including means for adjusting the height of the hand support.

19. The apparatus of claim 15, further including a cushion that is bonded to the hand support.

20. The apparatus of claim 17, further including means for limiting movement of the pointing device beneath the hand support.

21. The apparatus of claim 20, wherein the means for limiting movement includes a stop, which extends from the back wall to a point intermediate the back wall and the front edge of the hand support.

22. The apparatus of claim 15, wherein the computer pointing device includes a multidirectional detection device for controlling an on-screen indicator and wherein movement of the computer pointing device relative to the apparatus actuates the multidirectional detection device.

23. An apparatus for use with a computer pointing device, the apparatus minimizing posture- and stress-related disorders associated with the use of the computer pointing device, the apparatus comprising:
  a base that includes an upper surface upon which the computer pointing device may rest;
  a palm support section for supporting a user's palm, the palm support section extending over a portion of the upper surface of the base and configured to be spaced above the pointing device so as to not interfere with movement of the pointing device between the palm support section and the upper surface of the base; and
  means for coupling the palm support section to the base.

24. An apparatus comprising:
  a pointing device;
  a base that includes an upper surface upon which the computer pointing device may rest;
  a palm support section for supporting a user's palm, the palm support section extending over a portion of the upper surface of the base to allow at least a part of the pointing device to be positioned between the palm support section and the upper surface of the base; and
  means for coupling the palm support section to the base.

25. The apparatus of claim 24, wherein the distance between the palm support section and the upper surface of the base is at least slightly greater than the height of the pointing device, allowing the pointing device to be moved relative to the apparatus during use.

* * * * *